United States Patent
Kumar et al.

(10) Patent No.: US 7,734,792 B2
(45) Date of Patent: Jun. 8, 2010

(54) SECURE TUNNEL DOMAIN NAME MANAGEMENT

(75) Inventors: Chendil Kumar, Bangalore (IN); Allu Babula, Ganjam (IN); Vishnu Govind Attur, Bangalore (IN)

(73) Assignee: Novell, Inc., Provo, UT (US)

( * ) Notice: Subject to any disclaimer, the term of this patent is extended or adjusted under 35 U.S.C. 154(b) by 223 days.

(21) Appl. No.: 11/973,462

(22) Filed: Oct. 9, 2007

(65) Prior Publication Data

US 2009/0031028 A1 Jan. 29, 2009

(30) Foreign Application Priority Data

Jul. 25, 2007 (IN) .......................... 1564/DEL/2007

(51) Int. Cl.
*G06F 15/16* (2006.01)
*G06F 9/00* (2006.01)
*G06F 17/00* (2006.01)

(52) U.S. Cl. .......................... 709/227; 709/228; 726/15

(58) Field of Classification Search ................. 709/223, 709/225, 228–229; 726/15
See application file for complete search history.

(56) References Cited

U.S. PATENT DOCUMENTS

| 2003/0028650 | A1* | 2/2003 | Chen et al. .................. 709/229 |
| 2003/0041091 | A1 | 2/2003 | Cheline et al. |
| 2004/0073707 | A1* | 4/2004 | Dillon ........................ 709/245 |

* cited by examiner

*Primary Examiner*—Philip J Chea
(74) *Attorney, Agent, or Firm*—Schwegman, Lundberg & Woessner, P.A.

(57) ABSTRACT

Apparatus, systems, and methods may operate to establish a virtual private network (VPN) connection between a server in a private network and a client in a public network. Additional activities include intercepting a socket call from the client requesting resolution of a network address associated with a domain name in the private network, searching a local linked list for the network address, returning the network address to the client if the network address is found in the local linked list, and, if the network address is not found in the local linked list, sending a request to resolve the network address to a domain name system (DNS) server in the private network. Additional apparatus, systems, and methods are disclosed.

24 Claims, 3 Drawing Sheets

SECURE TUNNEL DOMAIN NAME MANAGEMENT

RELATED APPLICATIONS

The present application claims priority to India Patent Application No. 1564/DEL/2007 filed in the India Patent Office on Jul. 25, 2007 and entitled "SECURE TUNNEL DOMAIN NAME MANAGEMENT;" the disclosure of which is incorporated by reference herein.

FIELD

The embodiments disclosed herein relate generally to data processing, including the management of domain name address resolution operations.

BACKGROUND

Data is collected, organized, and processed for virtually every transaction and communication that occurs in today's global economy. The integrity of this information (e.g., the authenticity and/or security of a message) has become important to enterprises and individuals. Consequently, a variety of techniques for securing and replicating information exist in the industry.

For example, a Virtual Private Network (VPN) is an extension of a private network that uses public network space (e.g., the Internet) to allow remote users or networks to connect to the private network. A VPN incorporates encryption and tunneling to deliver data safely and privately from the private network, across the public space, to the remote user/network.

The Domain Name System (DNS) stores information about domain names in a database on a network, such as the Internet, to provide a physical location (e.g., internet protocol (IP) address) for each hostname. Thus, when a domain name request is made by a client connected to the public network, a DNS server in the public network, perhaps accessed by the default Windows® DNS client, is used to resolve the hostname into the proper IP address.

However, when a user has established a VPN tunnel connection with a private network using socket interception through DLL injection, the default DNS client does not have access to host addresses within the private network because the socket calls used by default DNS client can not be intercepted through DLL injection. Thus, attempts by the default process to resolve addresses associated with the protected resources will fail.

SUMMARY

In various embodiments, apparatus, systems, and methods for domain name management using VPN tunnel connections are provided. For example, in some embodiments, domain name management includes establishing a VPN connection between a client in a public network and a server in a private network, and intercepting a socket call from the client, wherein in the socket call is used to request resolution of a domain name (into an address) in the private network. Such activities may further include searching a local linked list, maintained by the client as a cache, for a network address associated with the domain name, returning the network address to the client if the network address is found in the local linked list, and otherwise, sending a request to resolve the domain name to a DNS server in the private network. Additional embodiments are described, and along with the foregoing example, will be set forth in detail below.

DETAILED DESCRIPTION

Figure 1:
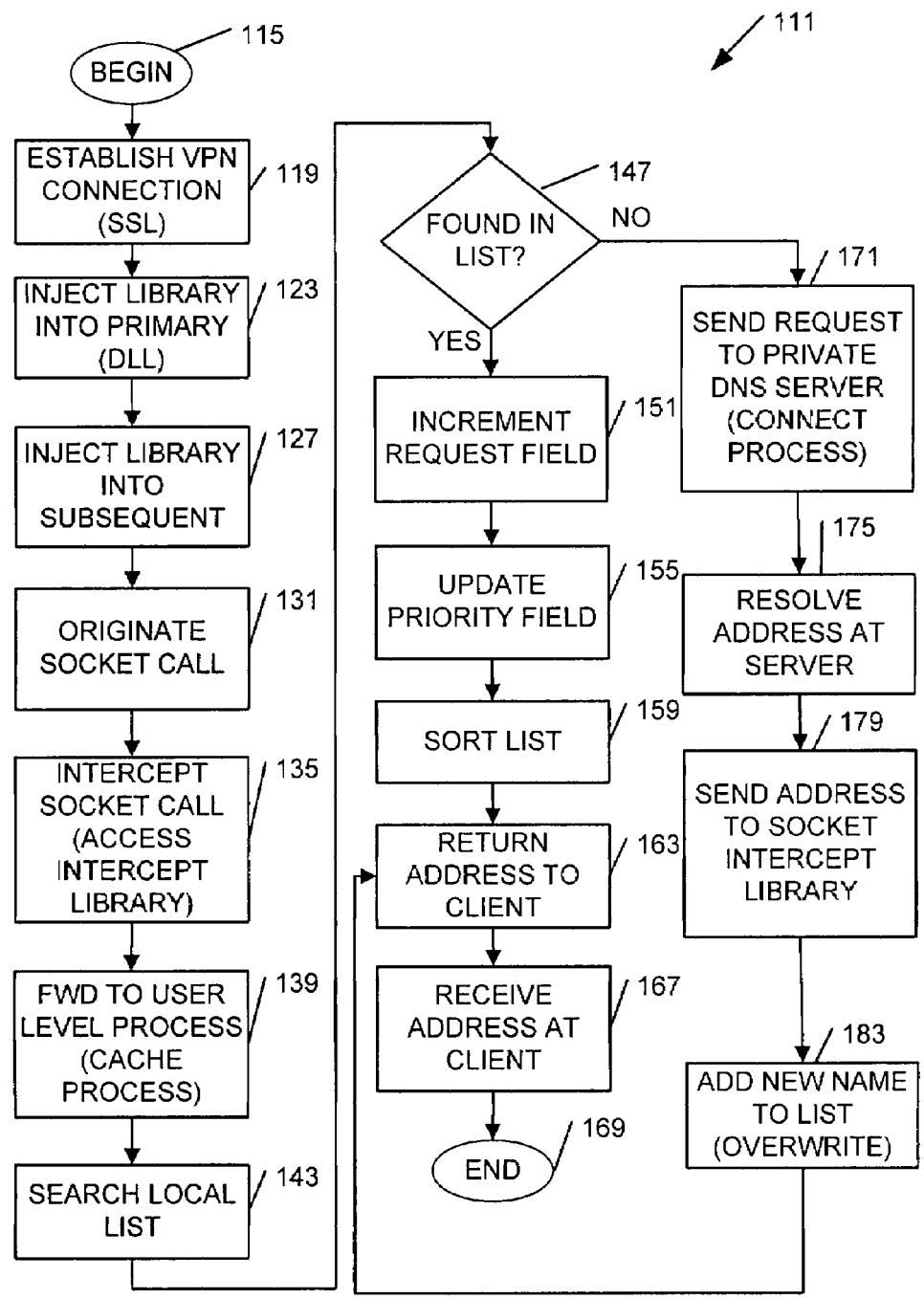
FIG. 1 is a flow diagram illustrating domain name resolution methods for VPN connections, according to various embodiments of the invention.

Some of the challenges described above may be addressed by implementing a VPN client component that executes a private client DNS cache as a user-level process. The cache process includes a dynamic link library (DLL) to intercept calls to a default socket application interface (API), such as the Winsock API, when host addresses are requested to create a socket connection, for example. In this way, control can be passed to the DLL replacement API as a substitute, in many cases, for using the VPN tunnel. DNS caching can also be implemented for those applications that use the hooking approach for establishing a secure tunnel.

Most interprocess communication uses the client-server model. These terms refer to the two processes which will be communicating with each other. One of the processes, the client, typically connects to the other process, the server, to make a request for information. An analogy might be one person (e.g., the client) who makes a phone call to an information service (e.g., the server) to retrieve the phone number for another person.

Notice that the client knows of the existence of and the address of the server, but the server does not need to know the address of (or even the existence of) the client prior to the connection being established. Notice also that once a connection is established, both sides can send and receive information.

To establish a connection (including a VPN connection) between a client and a server in the network context often involves the basic construct of a socket. Each process, client and server, establish their own socket as one end of the interprocess communication channel.

The steps involved in establishing a socket on the client side may include creating a socket with a socket( ) system call, and connecting the socket to the address of the server using the connect( ) system call. Data may then be sent and received, perhaps using read( ) and write( ) system calls. When socket calls are used during this process to request an address, then can be intercepted and processed as described in detail below.

As used herein, an "application" refers to a set of software instructions, a service, or a system that interacts with data housed at a "data source," which refers to a volume or collection of volumes that house the data for applications.

A "client terminal" means a hardware device that is capable or having one or more client processes executing on it.

The terms "private network," and "public network" are relative, which means that when something is designated as being in or forming part of a "private network," this means it is not directly accessible by entities, such as clients, coupled to the public network. Similarly, when something is designated as being in or forming part of a "public network" (e.g., the Internet), this means that it does not normally have direct access to entities that are part of a private network. One useful mechanism for providing special access between the private network and the public network is a tunnel connection, such as that provided by a VPN.

FIG. 1 is a flow diagram illustrating domain name resolution methods 111 for VPN connections, according to various embodiments of the invention. The methods 111 are implemented in a machine-accessible and readable medium. The domain name resolution methods 111 are operational over processes within and among networks. The networks may be wired, wireless, or a combination of wired and wireless. The methods 111 may be implemented as instructions, which when accessed by a machine, perform the processing depicted in FIG. 1. Given this context, domain name resolution in conjunction with VPN connections is now discussed with reference to FIG. 1.

In some embodiments, the method 111 of DNS domain name resolution for VPN connections may begin at block 115, and continue on to block 119 with establishing a VPN connection between a client in a public network and a server in a private network. Establishing the VPN connection may comprise establishing a number of different types of connections, including a secure socket layer (SSL) connection.

The method 111 may include injecting a socket interception library into a primary user-level process executing on the client while establishing the VPN connection as a tunnel at block 123. For example, the primary user-level process may comprise a VPN client component running on a client terminal. The socket interception library may comprises a dynamic link library (DLL), well known to those of ordinary skill in the art. This approach is in contrast to what occurs in conventional systems, where operating system security policies do not permit injecting libraries (such as DLLs) into system-level processes, such as the default DNS client process (e.g., svchost.exe).

The method 111 may include injecting the socket interception library into subsequent user-level processes initiated by the primary user-level process at block 127, such as when a hooking approach to establishing the VPN connection is used. A subsequent user-level process may comprise a DNS cache process, for example.

The method 111 may go on to block 131 with originating a socket call (e.g., the gethostname( ) call), perhaps by a process executing on the client terminal, requesting resolution of a domain name in the private network. An example of such processes include the Novell Groupwise® messaging application, the Microsoft® iexplore.exe Internet browser, the remote desktop protocol (RDP), the PuTTY remote session client program, and the Citrix® Metaframe remote operating environment.

The method 111 may thus include intercepting a socket call from the client requesting resolution of a domain name in the private network at block 135. Therefore, at block 135, the method 111 may also include accessing a socket interception library by a user-level process, prior to accessing a default socket application interface (e.g., the Winsock API). The socket interception library can be used to maintain a local linked list containing domain names in the private network, referenced to addresses in the private network. The local linked list can be stored in a number of locations, but may be more easily accessed if it is stored as part of the client process, or at least within the memory of the client terminal.

After intercepting the socket call at block 135, the method 111 may go on to block 139 to include forwarding the socket call to a user-level process (e.g., a cache process executing on the client terminal) that maintains the local linked list.

The method 111 may include searching the local linked list for a network address associated with the domain name at block 143. In many embodiments, the local linked list may be maintained by the client as a cache.

If it is determined that the network address associated with the domain name is found in the local linked list at block 147, then the method 111 may include incrementing a field in the local linked list according to the number of times the domain name associated with the network address in the private network has been requested at block 151.

In some embodiments, the method 111 may go on to include updating a priority field in the local linked list at block 155 if the network address is found in the local linked list at block 147. The method 111 may also go on to include sorting the local linked list according to the number of times the domain name associated with the network address in the private network has been requested, or according to the value of the priority field, at block 159.

Once the network address associated with the domain name has been obtained, the method 111 may include returning the network address to the client at block 163. The method 111 may thus include receiving the network address at the client from the socket call interception library at block 167. The method 111 may then conclude at block 169.

If the network address is not found in the local linked list at block 147, the method 111 may include sending a request to resolve the domain name to a DNS server in the private network at block 171, and resolving the network address at the DNS server at block 175. Sending the request to resolve the domain name may comprise connecting a user-level process (e.g., a DNS cache process) to the DNS server using the VPN connection. In some embodiments, the method 111 may go on to include sending the network address to the socket interception library after the network address is resolved by the DNS server at block 179.

The method 111 may include adding a new domain name to the local linked list at block 183 if the domain name was not found in the local linked list at block 147. In some embodiments, the method 111 may also include overwriting the lowest priority domain name entry in the local linked list with information associated with the new domain name if the network address was not found in the local linked list at block 147. For example, low-priority domain name information in the local linked list might be overwritten if the number of domain name entries in the list is equal to or greater than some preselected limit.

Figure 2:
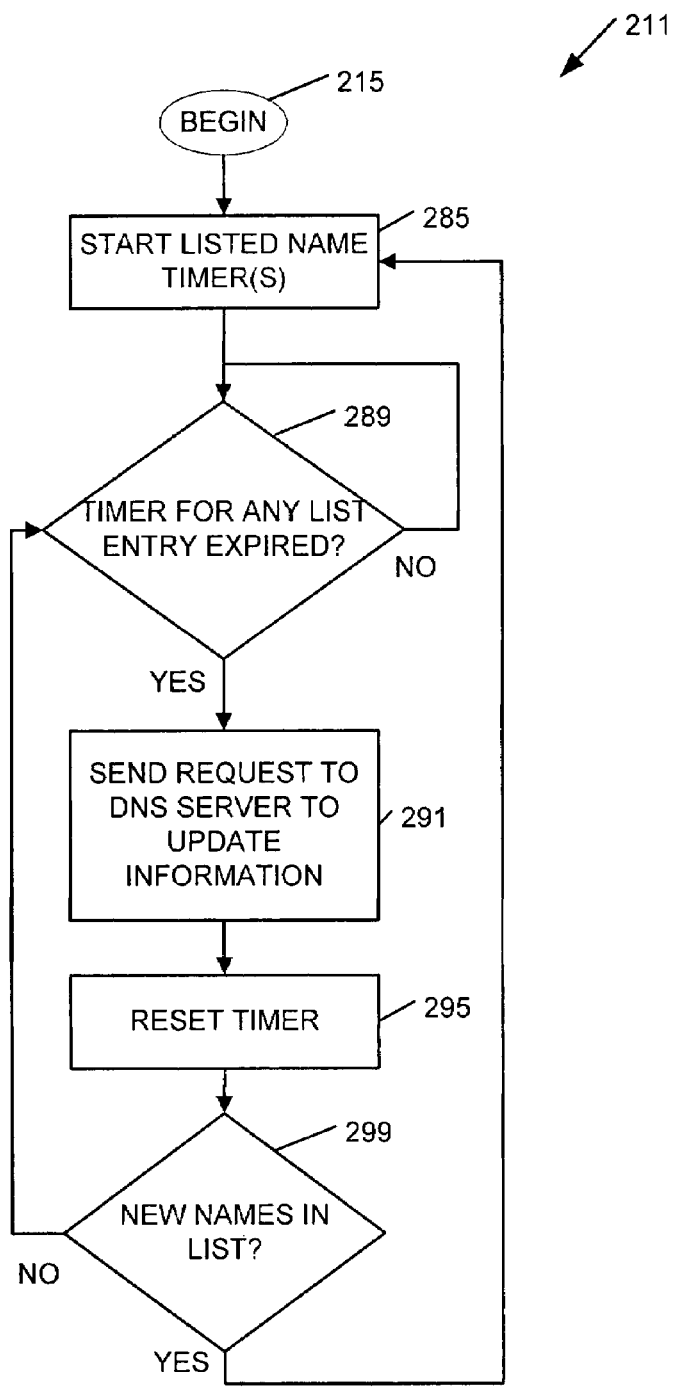
FIG. 2 is a flow diagram illustrating list update methods that can be used in conjunction with the methods of FIG. 1, according to various embodiments of the invention.

FIG. 2 is a flow diagram illustrating list update methods 211 that can be used in conjunction with the methods of FIG. 1, according to various embodiments of the invention. In this case, domain name resolution is described with an emphasis on updating the cached list of domain names at the client location.

The methods 211 are implemented in a machine-accessible and readable medium. The list update methods 211 are operational over processes within and among networks. The networks may be wired, wireless, or a combination of wired and wireless. The methods 211 may be implemented as instructions, which when accessed by a machine, perform the processing depicted in FIG. 2.

To implement list updates according to various embodiments of the invention, a method 211 may begin at block 215, and continue on to block 285 with starting one or more timers, wherein each timer is associated with a particular domain name in the local linked list. For example, an individual timer associated with a particular domain name may be started at about the same time an address for the domain name is first obtained from a DNS server and stored in the local linked list.

Each timer may be configured to count down and time out after a selected time period. In this manner, when it is determined that a timer associated with a particular domain name has expired at block 289, the method 211 may go on at block 291 to include periodically sending an update request (e.g., to resolve an address associated with that domain name) to the DNS server via the VPN connection. That is, a request to update the information associated with the domain name can be sent upon expiration of the timer associated with the local linked list and the domain name. In some embodiments, the method 211 may include at block 295 resetting the timer associated with the domain name (and the local linked list) after obtaining the address associated with the domain name from the DNS server. The reset timer can then begin a new count down cycle.

The method 211 may continue with determining whether any new domain names have been added to the local linked list at block 299. If not, then the method 211 may continue with checking for expired timers at block 289. If a new domain name has been added to the list, then the method 211 may continue at block 285 with starting a timer associated with the new domain name.

Those of ordinary skill in the art will realize that each of the method elements shown in FIG. 2 may be added to or substituted for any of the method elements shown in FIG. 1. Additionally, those of ordinary skill in the art will also realize that each of the method elements of both FIGS. 1 and 2 may be combined with the others in a variety of ways, to form a variety of methods that use the elements from each of the figures in serial, parallel, looped, and/or repetitious fashion.

When such methods are implemented, a mechanism is provided that can efficiently store DNS entries on a client terminal. Thus, if an intercepted socket calls contain a DNS domain name, instead of immediately sending the DNS request to the private network DNS server through an SSL-VPN tunnel, for example, a local data structure (e.g., the local linked list) can be examined. This list can be used to store DNS entries, sorted according to various priority schemes, and updated to remove stale entries. The list can be maintained as a cache for even greater efficiency.

Thus, the local linked list may be formulated and maintained in a number of ways. For example, a DNS cache process may be used to maintain the list as a cached set of DNS entries corresponding to nodes in the private network. Each of the entries may include the following attributes or fields: DNS domain name, IP address, timer value, number of hits, least recently used (LRU) node, and priority.

The timer value field may be initialized when a node is added to the list, and reset to count down each time the node information has been updated. Once the timer associated with a node has timed out, this may be used as a trigger to solicit updated information from a DNS server in the private network, as mentioned previously.

The number of hits field may be used to record the number of times that a DNS domain name has been requested during a user session on the client terminal. It can be incremented each time a domain name is requested, for example.

The LRU node field can be used to keep track of how recently nodes are used. It can be implemented as an individual timer, for example, that counts up during the length of time it takes until the corresponding node is used. Thus, greater values in the LRU field correspond to nodes that are used the least. It can also be implemented as a time stamp indicating when the node (and associated domain name) were last used. In this case, the difference between the current time and the LRU node field time stamp also increase with the time since the node was last used.

The priority field can include a value that is a function of the number of hits field and the LRU field. For example, the priority field may be the product of the number of hits field and the reciprocal of the LRU field for a selected domain name (assuming the LRU field increases in value with the length of time since the corresponding domain name was last requested). It may also be the difference between the number of hits field and a scaled value of the LRU field for a selected domain name. Other functions are possible, as is well known to those of ordinary skill in the art.

To manage the list, once a VPN connection is established, socket calls such as the gethostbyname( ) call and the getaddrinfo( ) call are intercepted and the DNS request is forwarded to the local DNS cache process that can be executed on the client terminal. The DNS cache process can then search the list for an entry corresponding to the requested name. If found in the list, the IP address corresponding to the domain name is sent back to the requesting application. If no entry is found in the list, the DNS cache process can send the request on to the DNS server in the private network. Once found, the information corresponding to the requested name can be added to the list based on the reply received from the DNS server, and the address resolved in association with the requested name can be sent back to the requesting application.

Information can be added to the head of the list only, or at other locations. The priority field corresponding to each domain name can be updated periodically, and the entire list can be sorted based on the priority field value so that the most requested (based on the number of hits field) and used (based on the LRU field value) nodes can be accessed more easily. This is because searches for domain names do not traverse the entire list as often when information associated with the more popular names is saved near the beginning of the examined storage locations.

The list may be limited to a maximum number of domain names during configuration operations. Once the limit is reached, the lowest priority nodes (e.g., nodes having a low priority field value) can be deleted and/or overwritten in order to add new entries.

The DNS cache process can be implemented as a user-level process, maintained on individual client machines, as desired. A VPN client component process, which executes on the client terminal and establishes a VPN connection between the client and a VPN server in a private network can execute the DNS cache process, injecting the socket interception library into the DNS cache process. Using this approach permits intercepting socket calls directed to the default API (e.g., the Winsock API), so that any such call initiated by an application and directed to the private network will result in control being passed to the socket interception library injected into the DNS cache process. Many other embodiments may be realized.

Figure 3:
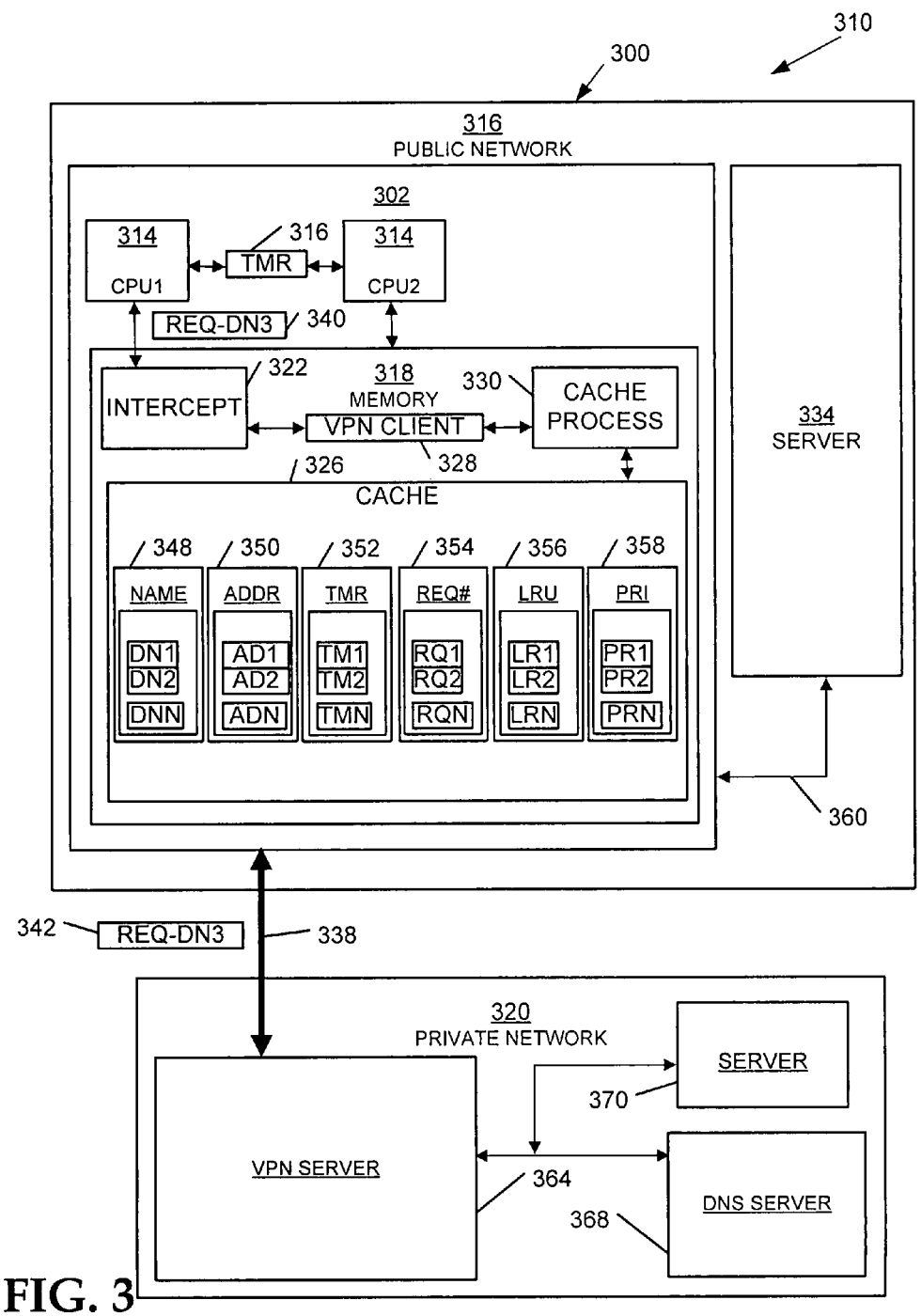
FIG. 3 is a block diagram of domain name resolution apparatus and systems used in conjunction with VPN connections, according to various embodiments of the invention.

For example, FIG. 3 is a block diagram of domain name resolution apparatus 300 and systems 310 used in conjunction with VPN connections, according to various embodiments of the invention. The domain name resolution apparatus 300 and systems are implemented in a machine-accessible and readable medium and operational over one or more networks (e.g., the local area network (LAN) 318 and the wide area network (WAN) 338). The networks may be wired, wireless, or a combination of wired and wireless. The domain name resolution apparatus 300 and systems 310 implement, among other things, the processing associated with the domain name resolution and list update methods 111 and 211 of FIGS. 1 and 2, respectively.

Turning now to FIG. 3, it can be seen that in some embodiments a domain name resolution apparatus 300 comprises a client terminal 302 in a public network 316, and a memory 318 in the client terminal 302 configured to store a DNS cache 326. The DNS cache 326 can be configured to cache a plurality of network addresses 350 associated with a private network 320 coupled to the client terminal 302 using a VPN connection 338.

The apparatus 300 may include one or more processors 314 configured to execute a user-level process 330 to maintain the DNS cache 326 and to intercept socket calls 340 directed to a server 370 in the private network 320 after the VPN connection 338 is established. As shown here, the memory 318 and the processors 314 are included in the client terminal 302, but such is not necessary. In some embodiments, the memory 318 and one or more of the processors 314 form a portion of a symmetric multiprocessing architecture. The DNS cache 326 can also be used to store domain names 348, timer values 352 or pointers to timers, number of hits 354, LRU values 356, and priority values 358.

The apparatus 300 may include one or more timers 316 configured to measure a period of time which, upon expiration, triggers updating information associated with at least one of the plurality of network addresses 350 associated with domain names 348 in the DNS cache 326.

One or more of the processors 314 may be configured, via software, hardware, or firmware programming to perform a variety of functions. For example, the processors 314 can be configured to execute a process (e.g., a DNS cache process 330) to maintain the DNS cache 326 in the form of a linked list. The processors 314 may also be configured to execute a process (perhaps the DNS process again) that issues a resolution request for a domain name to a DNS server 368 in the private network if a network address associated with the domain name (e.g., the address AD3 associated with domain name DN3) is not stored in the DNS cache 330. The processors 314 can also be configured to execute a process to update information associated with at least one of the plurality of network addresses 350 if a timer (e.g., timer TM1) associated with the DNS cache 330 has expired. The socket interception library 322 can be injected into the process 328 (e.g., VPN client component), as desired.

The apparatus 300 may comprise a switch (e.g., an L4 switch), a server, a terminal, a personal computer, a workstation, or any combination of these. The memory 318 and the processors 314 may be included in a single terminal 302 or server, as shown, or exist as separate hardware elements, perhaps coupled together by a local area network (LAN) 360. Modules may comprise hardware, software, and firmware, or any combination of these.

The client terminal 302 may comprise a single entity, or several entities in communication with one another, such as one or more Novell® Access Manager clients, or any device that can connect to a private network 320 using a VPN connection 338. Still further embodiments may be realized.

For example, it can be seen that a domain name resolution system 310 may comprise a DNS server 368 in a private network 320, and a client terminal 302 in a public network 316, wherein the client terminal 302 may be configured with a memory 318 to store a list maintained as a DNS cache 326 when the private network 320 is coupled to the client terminal 302 using a VPN connection 338, as described above. The processors 314 may then be configured to execute a user-level process 330 to maintain the DNS cache 326 and to intercept socket calls 340 directed to the DNS server 368 in the private network 320 after the VPN connection 3338 is established. Any and all of the features of the client terminal 302 described above may be incorporated into the system 310, so that the processors 314 can be configured in a number of ways to perform various functions.

Implementing the apparatus, systems, and methods described herein may thus provide improved performance for clients coupled to private networks using VPN connections, since DNS queries with respect to the private networks may in most cases be resolved locally, instead of sending each query to the private network over the VPN connection. This may in turn provide more efficient VPN bandwidth use.

Various embodiments of the invention can be implemented in existing network architectures, directory services, security systems, storage interfaces, operating systems, file system process, backup systems, replication systems, and/or communication devices. For example, in some embodiments, the techniques presented herein are implemented in whole or in part using Novell® network services, proxy server products, email products, operating system products, and/or directory services products distributed by Novell, Inc. of Provo, Utah.

Embodiments of the invention can therefore be implemented in a variety of architectural platforms, operating and server systems, devices, systems, or applications. Any particular architectural layout or implementation presented herein is thus provided for purposes of illustration and comprehension only, and is not intended to limit the various embodiments.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. § 1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An apparatus, comprising:
a client terminal in a public network;
a memory in the client terminal configured to store a domain name system (DNS) cache, wherein the DNS cache is configured to cache a plurality of network addresses associated with a private network coupled to the client terminal using a virtual private network (VPN) connection; and
a processor configured to execute a user-level process to maintain the DNS cache, to intercept socket calls directed to a DNS server in the private network after the VPN connection is established, and to locally return a network address associated with a domain name without sending a resolution request for the domain name to the DNS server if the network address is stored in the DNS cache; and sending the resolution request for the domain name to the DNS server in the private network if the network address associated with the domain name is not stored in the DNS cache.

2. The apparatus of claim 1, comprising:
a timer configured to measure a period of time which, upon expiration, triggers updating information associated with at least one of the plurality of network addresses.

3. The apparatus of claim 1, wherein the memory and the processor are included in the client terminal.

4. The apparatus of claim 1, wherein the processor is configured to execute a process to maintain the DNS cache in the form of a linked list.

5. A system, comprising:
a domain name system (DNS) server in a private network;
a client terminal in a public network;
a memory in the client terminal configured to store a DNS cache, wherein the DNS cache is configured to cache a plurality of network addresses associated with the private network, and wherein the private network is coupled to the client terminal using a virtual private network (VPN) connection; and
a processor configured to execute a user-level process to maintain the DNS cache, to intercept socket calls directed to the DNS server in the private network after the VPN connection is established, and to locally return a network address associated with a domain name without sending a resolution request for the domain name to the DNS server if the network address is stored in the DNS cache; and
sending the resolution request for the domain name to the DNS server in the private network if the network address associated with the domain name is not stored in the DNS cache.

6. The system of claim 5, wherein the processor is to execute a process to update information associated with at least one of the plurality of network addresses if a timer associated with the DNS cache has expired.

7. The system of claim 5, wherein the memory and the processor form a portion of a symmetric multiprocessing architecture.

8. A method, comprising:
establishing a virtual private network (VPN) connection between a client in a public network and a server in a private network;
intercepting a socket call from the client requesting resolution of a domain name in the private network after the VPN connection has been established;
searching a local linked list, maintained by the client as a cache, for a network address associated with the domain name;
locally returning the network address to the client without sending a request to resolve the domain name to a domain name system (DNS) server in the private network if the network address is found in the local linked list; and
if the network address is not found in the local linked list, sending the request to resolve the domain name to the DNS server.

9. The method of claim 8, wherein establishing the VPN connection comprises:
establishing a secure socket layer (SSL) connection.

10. The method of claim 8, comprising:
injecting a socket interception library into a primary user-level process executing on the client while establishing the VPN connection as a tunnel.

11. The method of claim 10, wherein the socket interception library comprises a dynamic link library (DLL).

12. The method of claim 10, comprising:
injecting the socket interception library into subsequent user-level processes initiated by the primary user-level process.

13. The method of claim 8, wherein intercepting the socket call comprises:
prior to accessing a default socket application interface, accessing a socket interception library by a user-level process, wherein the socket interception library maintains the local linked list.

14. The method of claim 8, comprising:
forwarding the socket call to a user-level process that maintains the local linked list after intercepting the socket call.

15. The method of claim 8, comprising:
sending the network address to a socket interception library after the network address is resolved by the DNS server.

16. The method of claim 8, comprising:
receiving the network address at the client from a socket call interception library.

17. The method of claim 8, wherein sending a request to resolve the domain name comprises:
connecting a user-level process to the DNS server using the VPN connection.

18. The method of claim 8, comprising:
updating a priority field in the local linked list if the network address is found in the local linked list.

19. The method of claim 8, comprising:
periodically sending a request to resolve the domain name to the DNS server via the VPN connection upon expiration of a timer associated with the local linked list and the domain name.

20. The method of claim 8, comprising:
resetting a timer associated with the local linked list and the domain name after obtaining the address associated with the domain name from the DNS server.

21. The method of claim 8, further comprising:
adding a new domain name to the local linked list if the domain name is not found in the local linked list.

22. A method, comprising:
establishing a virtual private network (VPN) connection between a client in a public network and a server in a private network;
sorting a local linked list, maintained by the client as a cache, according to a number of times a domain name associated with a network address in the private network has been requested;
intercepting a socket call from the client requesting resolution of the domain name after the VPN connection has been established;

searching the local linked list for a network address associated with the domain name;

locally returning the network address to the client without sending a request to resolve the domain name to a domain name system (DNS) server in the private network if the network address is found in the local linked list; and periodically sending the request to resolve the domain name to the DNS server via the VPN connection upon expiration of a timer associated with the local linked list and the domain name.

23. The method of claim 22, comprising:

incrementing a field in the local linked list according to the number of times the domain name associated with the network address in the private network has been requested.

24. The method of claim 22, comprising:

overwriting a lowest priority domain name entry in the local linked list with information associated with a new domain name if the network address is not found in the local linked list.

* * * * *